United States Patent
Datta et al.

(10) Patent No.: US 9,885,568 B2
(45) Date of Patent: Feb. 6, 2018

(54) DETERMINING CAMERA HEIGHT USING DISTRIBUTIONS OF OBJECT HEIGHTS AND OBJECT IMAGE HEIGHTS

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/076,953

(22) Filed: Mar. 22, 2016

(65) Prior Publication Data
US 2016/0203611 A1 Jul. 14, 2016

Related U.S. Application Data

(63) Continuation of application No. 13/851,991, filed on Mar. 28, 2013, now Pat. No. 9,322,647.

(51) Int. Cl.
*G06K 9/52* (2006.01)
*G01C 5/00* (2006.01)
(Continued)

(52) U.S. Cl.
CPC ............... *G01C 5/00* (2013.01); *G06K 9/52* (2013.01); *G06K 9/6215* (2013.01); *G06T 5/006* (2013.01);
(Continued)

(58) Field of Classification Search
CPC .................................... G01C 5/00; H04N 7/18
See application file for complete search history.

(56) References Cited

U.S. PATENT DOCUMENTS

| 7,450,248 B2 | 11/2008 | Fujieda et al. |
| 7,593,546 B2 | 9/2009 | Jouppi |

(Continued)

FOREIGN PATENT DOCUMENTS

JP   3891181 B2   3/2007

OTHER PUBLICATIONS

LV, F., et al. "Self-Calibration of a camera from video of a walking human". 16th International Conference on Pattern Recognition, 2002. vol. 1. Inst. for Robotics & Intelligent Syst., Univ. of Southern California, Los Angeles, CA, USA. pp. 562-567.

*Primary Examiner* — Jay Au
*Assistant Examiner* — Marnie Matt
(74) *Attorney, Agent, or Firm* — Daniel R. Simek (57) ABSTRACT

A camera at a fixed vertical height positioned above a reference plane, with an axis of a camera lens at an acute angle with respect to a perpendicular of the reference plane. One or more processors receive camera images of a multiplicity of people of unknown height and vertical axis of the images are transformed into pixel counts. The known heights of people from a known statistical distribution of heights of people are received by one or more processors and transformed to a normalized measurement of pixel counts, based in part on a focal length of the camera lens, the angle of the camera, and an objective function summing differences between pixel counts of the known heights of people and the unknown heights of people. The fixed vertical height of the camera is determined by adjusting the estimated camera height to minimize the objective function.

20 Claims, 4 Drawing Sheets

(51) Int. Cl.
*G06K 9/62* (2006.01)
*G06T 5/00* (2006.01)
*G06T 7/60* (2017.01)
*H04N 7/18* (2006.01)
*G06T 7/00* (2017.01)

(52) U.S. Cl.
CPC .............. *G06T 7/0065* (2013.01); *G06T 7/60* (2013.01); *H04N 7/18* (2013.01); *G06T 2207/30196* (2013.01)

(56) References Cited

U.S. PATENT DOCUMENTS

| | | |
|---|---|---|
| 8,164,626 B2 | 4/2012 | Oyabu et al. |
| 8,289,392 B2 | 10/2012 | Senior et al. |
| 8,780,177 B2 | 7/2014 | Eccles et al. |
| 2009/0278927 A1 | 11/2009 | Ishiyama et al. |
| 2009/0290032 A1 | 11/2009 | Zhang et al. |
| 2011/0149041 A1* | 6/2011 | Eccles ................ H04N 13/004 348/46 |
| 2013/0201339 A1 | 8/2013 | Venkatesh |
| 2013/0222589 A1 | 8/2013 | Lalonde et al. |

* cited by examiner

DETERMINING CAMERA HEIGHT USING DISTRIBUTIONS OF OBJECT HEIGHTS AND OBJECT IMAGE HEIGHTS

FIELD OF THE INVENTION

The present invention relates generally to the field of video surveillance, and more specifically to determining a height of a video surveillance camera.

BACKGROUND OF THE INVENTION

Security measures are needed for businesses, government agencies and buildings, transportation and high traffic areas. One of the most common security implementations is the use of a camera to provide continuous, periodic, or on-demand surveillance of a targeted area. Additionally, cameras are often used for object recognition, and determining the position, size or dimensional measurement of objects.

By using information associated with the positioning of a camera, including the height of a camera above the surface that it monitors, and the angle of the line-of-view of the camera formed with a perpendicular line to the target surface, accurate estimates of size, length, and distance between objects can be calculated. Camera angle measurement techniques are known. Many surveillance cameras can self-determine the camera angle relative to a vertical or horizontal standard. The height measurement of a surveillance camera can be achieved in a variety of ways.

The height of a camera can be physically measured using measuring tape, calibrated telescoping poles or laser measurement devices. These are typically time-consuming techniques and may require expensive measurement and access equipment. Relocation, adjustment, or replacement of the camera may require repeating these measurement efforts.

Alternatively, a satellite positioning system, such as the global positioning system (GPS), may be added or incorporated with the camera. Cameras enabled or outfitted with GPS capability can report their height (or elevation compared to a reference model point such as sea level) as well as position, however, GPS-enabled cameras may have accuracy issues that detract from the use of the surveillance camera for accurate measurement. There may also be significant cost impacts for the purchase of GPS-enabled cameras or the purchase and effort of outfitting existing cameras with GPS devices.

Techniques are known to calculate the height of an elevated surveillance camera from knowledge of the viewing/tilt angle of the camera, knowledge of the known height of an object, such as a person in the camera viewing area, and the apparent height of the person as imaged by the camera. Other techniques are known that make use of distance detection devices to measure the distance to an object in the camera field of view and the tilt angle of the camera to determine the height of the elevated camera, or use calibration techniques making use of vanishing points and vanishing lines within the camera viewing field. Still other techniques use a plurality of coordinate data of the feet and heads of humans imaged in the camera viewing area, and use averages to determine camera height by substituting the coordinate data into a relation that includes: camera focal distance, camera angle, the average height of humans imaged, and an initial camera height.

These known techniques require additional equipment, such as distance detection or GPS devices, prior calibration, known object size of an imaged object, or elaborate coordinate systems to accurately calculate the height of an elevated surveillance camera. An objective of the present invention is to enable calculation of the height of a surveillance camera with improved accuracy, reduced sampling and without the need for additional equipment, calibration or prior height knowledge of an imaged object.

SUMMARY

Embodiments of the present invention disclose a method, computer program product and system for determining a height of a camera. The method for determining the height of camera includes a camera at a fixed vertical height positioned above a reference plane, an axis of a lens of the camera at an acute angle with respect to a perpendicular of the reference plane, and providing for one or more processors to receive from the camera, over a specified time period, a multiplicity of images of a multiplicity of people of unknown height within a field of view of the camera. One or more processors transforms a vertical axis of each image of the multiplicity of images of the multiplicity of people of unknown height into a pixel count. One or more processors determine a statistical distribution of pixel counts of the multiplicity of images of the multiplicity of people of unknown height. One or more processors receive a statistical distribution of known heights of a multiplicity of people. One or more processors transform each height of the statistical distribution of known heights of the multiplicity of people to a normalized vertical measurement of a pixel count, based at least on a focal length of the lens of the camera, the acute angle of the camera, and a division operator of an objective function. One or more processors perform an objective function in which the statistical distribution of pixel counts of the multiplicity of images of the multiplicity of people of unknown height is compared to the statistical distribution of the multiplicity of people of known heights, in which each known height is normalized to a pixel count, and one or more processors determine the fixed vertical height of the camera by adjusting within the objective function the estimate of the fixed vertical height of the camera, until a difference of comparing the statistical distribution of pixel counts of the multiplicity of images of the multiplicity of people of unknown height, to the statistical distribution of pixel counts from the normalization of heights of the multiplicity of people of known heights, is minimized.

DETAILED DESCRIPTION

Figure 1:
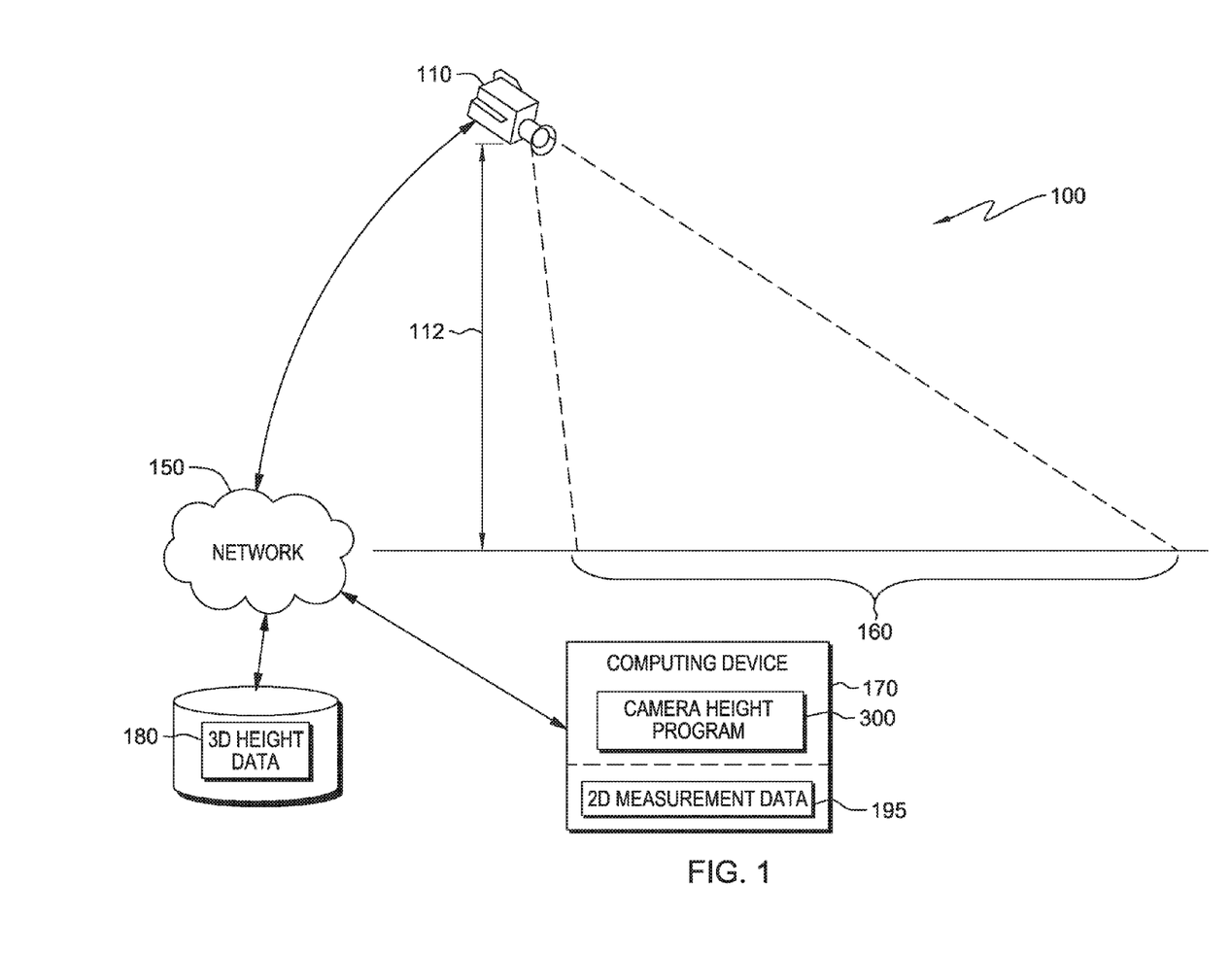
FIG. 1 is a functional block diagram illustrating a camera imaging system, in accordance with an embodiment of the present invention.

The present invention will now be described in detail with reference to the Figures. FIG. 1 is a block diagram illustrating camera imaging system 100, in accordance with one embodiment of the present invention. Camera imaging system 100 includes surveillance camera 110 (camera 110), computing device 170 that includes camera height program 300 and is interconnected to camera 110 via network 150, 3D height data 180 contains three dimensional (3D) human population height data, as measured in units such as centimeters, and 2D measurement data 195 contains two dimensional (2D) human image measurement data from the camera image, in units such as pixels. Camera 110 is supported at height 112 above a target area such as a floor, street, yard, railroad platform, and images area 160. Camera height program 300 determines the height 112 of the camera 110 as described in more detail below. In an exemplary embodiment of the present invention, camera 110 is a remote, elevated, surveillance camera which may be used to provide accurate determination of height, size, dimensions, distances and proximity of objects or subjects within image area 160. This information may be applicable to safety, security and law enforcement investigations. To accomplish measurements within image area 160 requires an accurate estimate of camera height, tilt angle and focal length.

The axis of the lens of camera 110 is at an acute angle with respect to a perpendicular to the reference plane, image area 160. Camera 110 is capable of producing digital images of objects within or moving into and out of image area 160. The images are accessible by authorized devices connected to network 150, such as computing device 170. Image area 160 may include, but is not limited to: traffic intersections, entrances, exits, banks, retail stores, airports, or any area in which image monitoring is deemed appropriate.

Network 150 may be, for example, a local area network (LAN), a wide area network (WAN) such as the Internet, or a combination of the two, and may include wired or wireless connections. In general, network 150 may be any combination of connections and protocols that supports communications and data transfer via suitable channels between camera 110, computing device 170, and 3D height data 180, in accordance with an embodiment of the present invention.

3D height data 180 is compiled empirical height data of a human population and is accessible to computing device 170 via network 150. In a preferred embodiment, the empirical data of 3D height data 180 includes human height data of a population representative of the location in which camera imaging system 100 is positioned. 3D height data 180 includes data consolidated from previous measurements, including statistical distribution parameters or compiled from other sources unrelated to camera 110 and image area 160.

Computing device 170 is a hardware device, authorized to access and receive images and data from camera 110 via network 150. Computing device 170 includes camera height program 300, 2D measurement data 195, and has access to 3D height data 180 via network 150. Camera height program 300 determines the height of a surveillance camera, such as camera 110, based on computations using camera angle, camera lens focal length, 2D measurement data 195, and 3D height data 180, as will be discussed in more detail below with respect to FIG. 3.

2D measurement data 195 includes measurement data of human images taken by camera 110 that include people within image area 160. Each 2D image of a person generated by camera 110 is based on the vertical length measurement of the image of the person within the image area of the camera. In one embodiment of the present invention, the 2D measurement of images of people within the camera images, is determined by a separate program operating on computing device 170, examining camera images and determining the measurement of the image heights. In other embodiments, the 2D measurement of human images may be manually measured by counting the pixels from the feet to the top of the head, of the image of the human subject in the camera image, and including the image height measurement data in 2D measurement data 195.

Samples of known heights of people are obtained from a known source of human height measurements, for example, a known statistical distribution of heights of people, and a representative population distribution of height of people is obtained using either a parametric or non-parametric distribution model. In one embodiment a parametric model uses the Gaussian distribution to estimate the mean and standard deviation of the distribution of 3D human subject height data. A parametric distribution model assumes that the data has come from a type of probability distribution and makes inferences about the parameters of the distribution. In another embodiment the distribution is estimated using a non-parametric model such as the kernel density estimation (KDE). A non-parametric model does not rely on assumptions that the data are drawn from a given probability distribution. The sampling height and distribution data are stored in 3D height data 180. Similarly a sampling of camera images that include 2D human image measurement data is collected and a distribution is obtained using a parametric or non-parametric distribution model, and stored in 2D measurement data 195.

Figure 4:
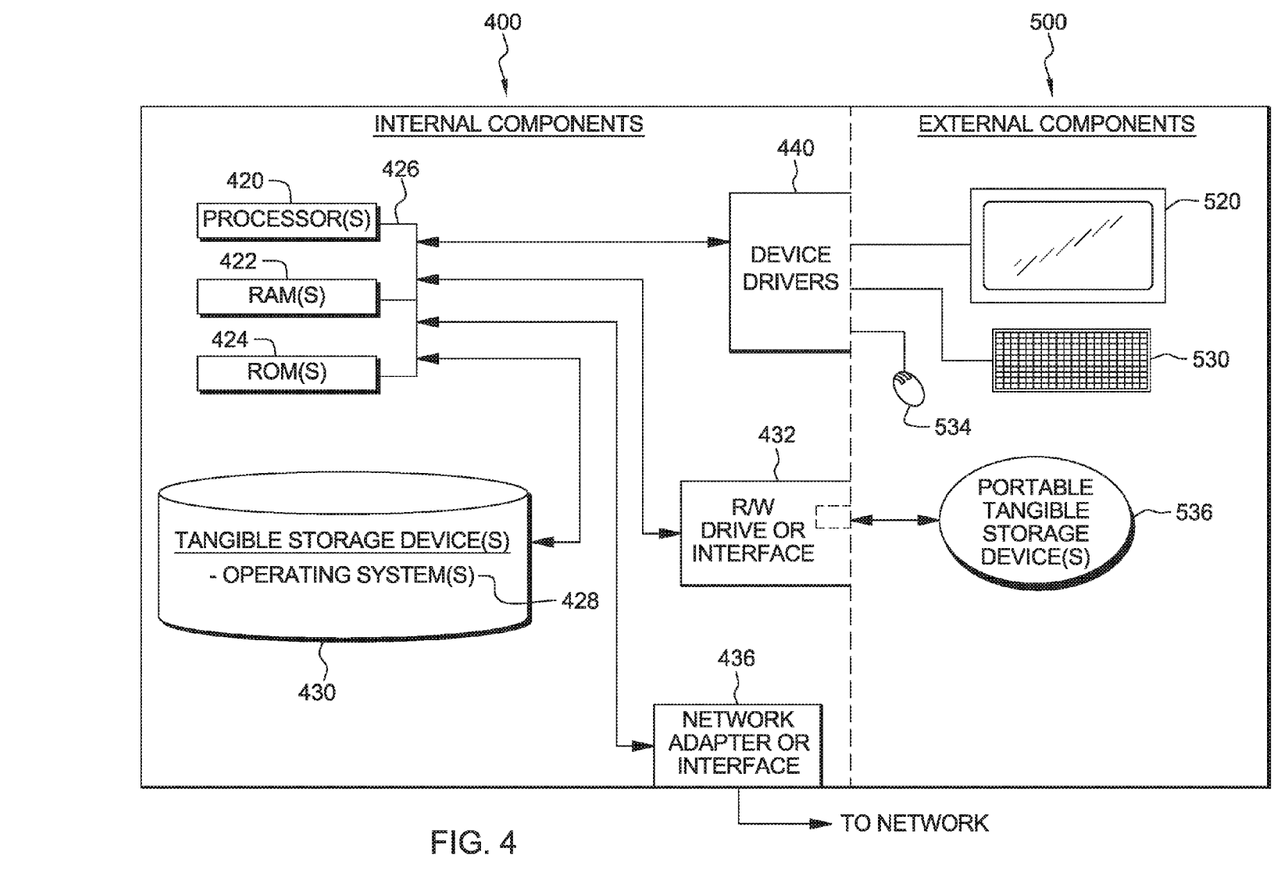
FIG. 4 is a functional block diagram of components of a computing device executing the program to determine camera height of FIG. 3, in accordance with an embodiment of the present invention.

In one embodiment, camera height program 300 and 2D measurement data 195 are stored on computing device 170 on a storage device consistent with the computing device component discussion associated with FIG. 4. In other embodiments, one or both of camera height program 300 and 2D measurement data 195 may reside on a remote storage device, a remote server, or any other device capable of storing digital data and program instructions that are accessible by computing device 170 via network 150. Computing device 170 can be computing systems utilizing clustered computers and components to act as single pools of seamless resources when accessed through network 150, or can represent one or more cloud computing datacenters. In general, computing device 170 can be any programmable electronic device as described in detail with respect to FIG. 4.

Figure 2:
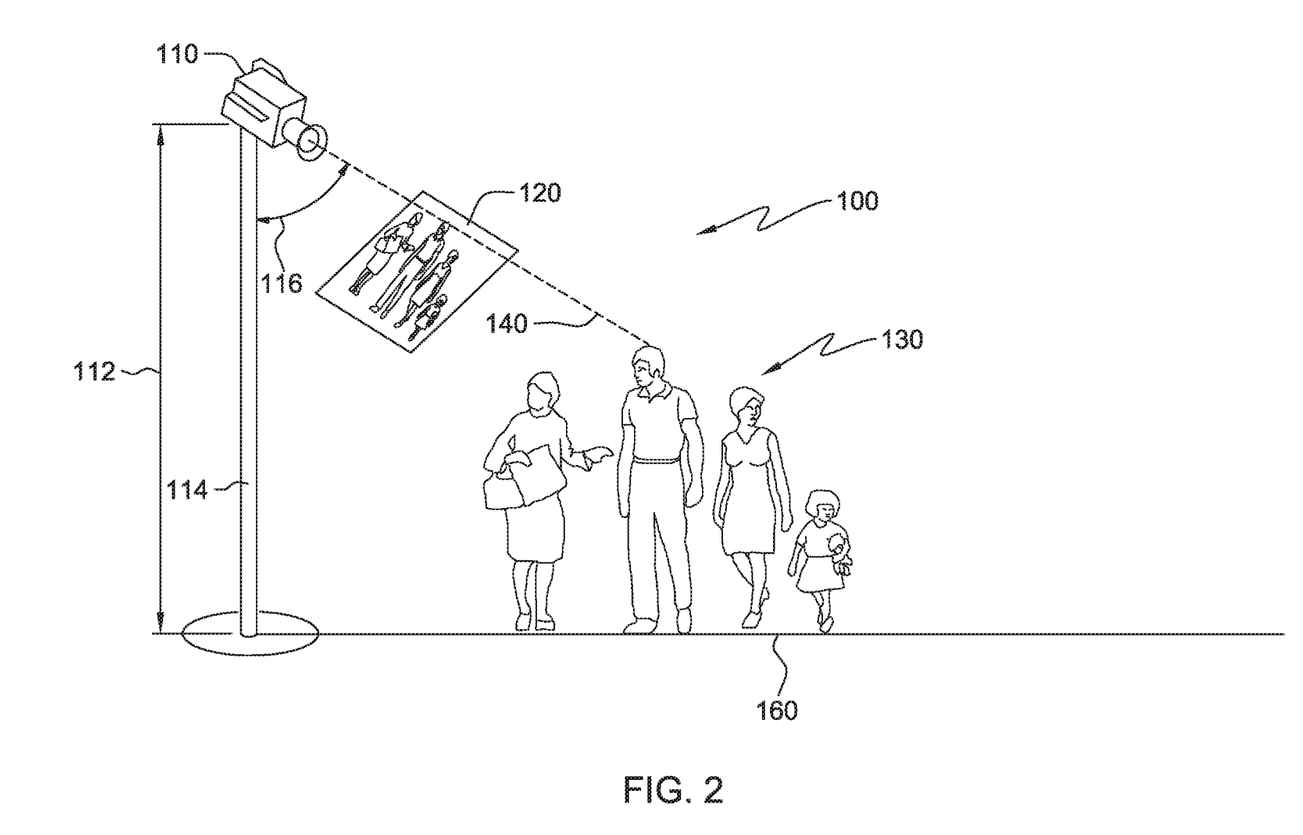
FIG. 2 is a diagram illustrating camera positioning and object imaging within the camera imaging system of FIG. 1, in accordance with an embodiment of the present invention.

FIG. 2 illustrates additional details of camera 110 and image area 160, in accordance to an embodiment of the present invention. Camera 110 is depicted positioned on camera support 114 at camera height 112. Camera support 114 may be a pole, a wall, a platform, a roof, a fence, or any supporting structure or object to which camera 110 is connected, to provide surveillance of image area 160. Camera 110 is tilted downwards towards the ground or base surface of image area 160, forming camera angle 116.

Image 120 represents a digital image created by camera 110 and includes images of objects or people within image area 160. People 130 may be standing or walking within image area 160, and image 120 represents an image of people 130 recorded by camera 110. In various embodiments, people 130 may be a general mix of humans, a single gender, or a young age group such as children.

Focal length 140 is a set value for camera 110 for image area 160. In one embodiment of the present invention, focal length 140 is a known, pre-set parameter of camera 110 for purposes of imaging people 130 in image area 160 for a period of time in which a plurality of human subjects may be imaged within image area 160.

Adjustments made in the transformation of 3D height samples to units of a 2D image measurement eliminates the need for requiring people to be imaged at a specific position within image area 160 of camera 110. This also eliminates the need to determine average 2D image heights and allows the use of random subjects in image area 160, such as people 130, to be used for 2D measurement data 195.

Figure 3:
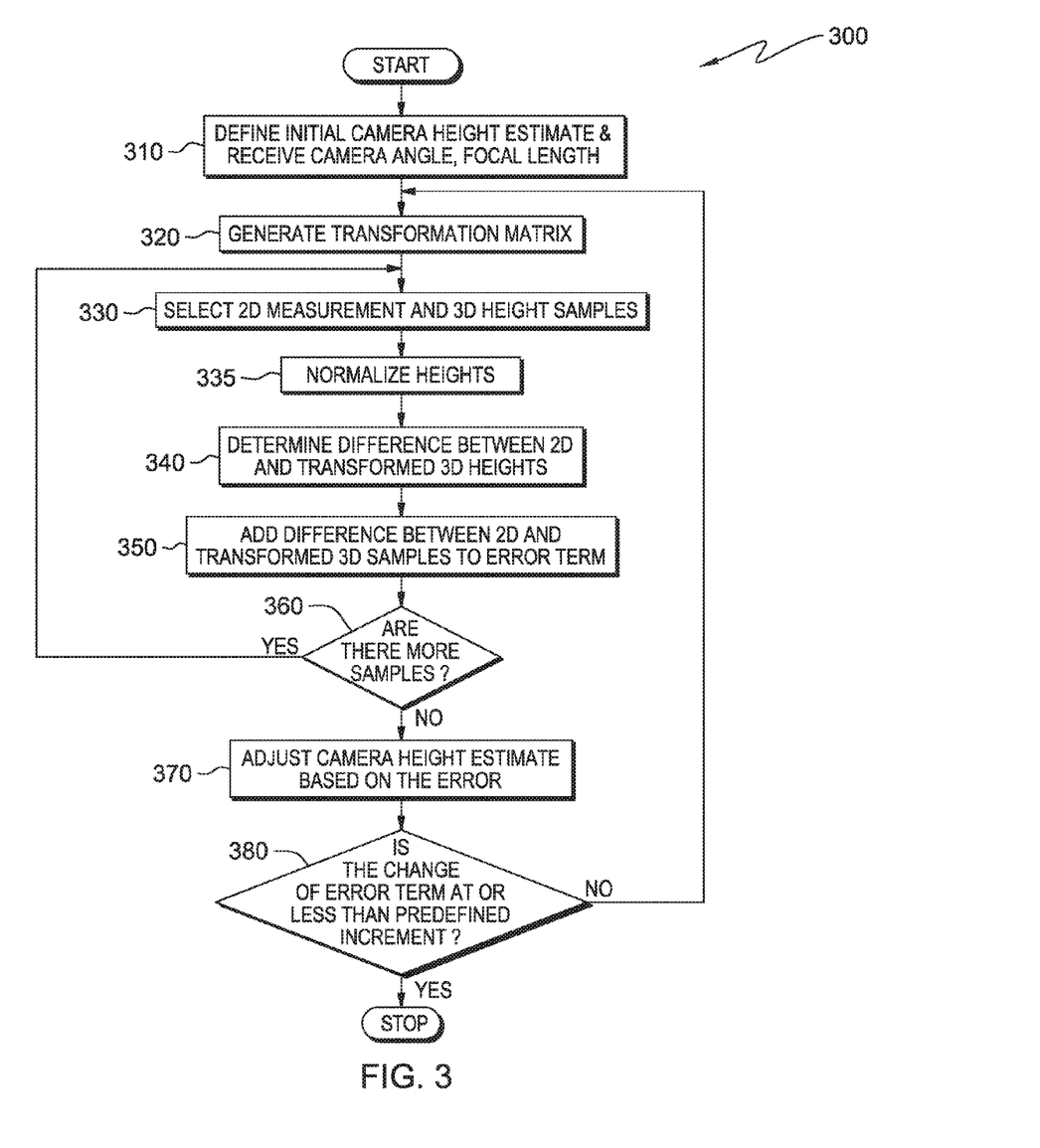
FIG. 3 is a flowchart depicting operational steps of a program to determine camera height, executed by a computing device connected to the camera imaging system of FIG. 1, in accordance with an embodiment of the present invention.

FIG. 3 is a flowchart depicting the operational steps of camera height program 300. In one embodiment of the present invention, camera height program 300 has access to known 3D height measurement data of people. Samples of known height data of people may be obtained by accessing previously collected height data of people, such as 3D height data 180 and selecting a number of sample height values, such that statistical characteristics of the sample height values approximate or match known characteristics of the distribution of known height data of people. Alternatively, known height data of people may be obtained by direct empirical measurement of an adequate sample size of people to represent the known distribution characteristics of the height data of people.

In other embodiments, the selection of a known subset of empirical 3D human heights may be made to align with the known location of the camera. For example, if the camera is located in a North American city and a large majority of the human subjects that pass through the surveillance area of the camera are adults, then selection of height measurements from North American adult population data may be appropriate. As an alternative example, selection of height data of age-specific people may be appropriate for surveillance areas that include schools or youth parks. In an alternative embodiment of the present invention, the projection of the known average human height for the appropriate set of people corresponding to the location of the surveillance camera, to a 2D image measurement, may be used for calculating differences between the projections of 3D height data 180 to image measurements, and samples of 2D measurement data 195.

In one embodiment, measurements of human images recorded by camera 110, are made by camera height program 300 and stored in 2D measurement data 195, and are accessible by camera height program 300. In other embodiments, measurements of human images recorded by camera 110 are received by computing device 170 and stored in 2D measurement data 195. 2D measurement data 195 includes multiple measurements of human images, which collectively approximates a population of measurements and can be characterized by statistical measures such as an average, median or mode of all the measurements. An average, median or mode, can be considered a first statistical measure of the collection of multiple human image measurements obtained from the camera images. Camera height program 300 receives the camera angle, and the pre-set camera focal length from camera 110, for example, and assigns an initial camera height estimate which will be optimized to a more accurate camera height value (step 310).

For example, camera height program 300 sets an initial height estimate of camera 110 based on an assumed typical deployment height between a second and third floor of a building. Camera height program 300 receives camera angle 116 and pre-set camera focal length 140 from camera 110. In alternative embodiments, camera height program 300 accesses camera angle 116 and focal length 140 from an updated camera profile parameter file.

Camera height program 300 uses camera angle 116, focal length 140, which is the camera lens focal length, and an initial estimate of camera height ($h_0$), to generate a transformation matrix, which is used to convert samples from 3D height data 180 to 2D projections of corresponding image measurements (step 320). For example, camera height program 300, uses the values received for camera angle 116, focal length 140 of camera 110 along with an initial estimated camera height that camera height program 300 generates based on assumed deployment conditions of the location of camera 110, to create a transformation matrix. The initial estimate of the height of camera 110 is used to develop and run an optimization that will converge to a more accurate value of the height of camera 110.

Three dimensional objects are represented by a set of three vectors, each of which indicates a direction and magnitude from a designated point of origin. Typically the three dimensional vectors are associated with "X, Y, and Z", where each represents a vector orthogonal to the others. The transformation matrix produces a projection of the three dimensional object to two dimensions, typically represented as coordinates "x, y". Transforming the 3D height data into two dimensional data facilitates comparison of the distributions of the height measurements. A general example of a transformation matrix is shown in equation 1:

$$P = \begin{bmatrix} f & h0 & t & 0 \\ f & h0 & t & 0 \\ 0 & 0 & 0 & 1 \end{bmatrix} \quad (1)$$

For camera height program 300, transformation matrix P includes "f", which corresponds to focal length 140, "t", which corresponds to camera angle 116, which is an acute angle with reference to a perpendicular to the plane of image area 160, and $h_0$, which corresponds to the initial estimate of camera height 112. The three rows of equation 1 can be further identified as $P_1$, $P_2$, and $P_3$, corresponding to the respective matrix row.

Height measurements typically align with one of the three vectors and therefore a height measurement of a three dimensional (real-world) object may have a value for the "Z" vector, for example, and zero for the other vectors. Two dimensional images are associated with two orthogonal vectors, and positions on a two dimensional image are typically represented by the coordinates "x, y". 2D vertical measurements within a camera image can be expressed by the difference between the "y" coordinate for the base of an object or the feet of an image of a person, and the "y" coordinate for the top of an object or the head of the image of the person.

The product of transformation matrix P and a sample from 3D height data 180 of known heights of people, each represented in matrix form, is calculated by camera height program 300, resulting in a normalized measurement of the 3D height data measurement, to a corresponding measurement within a camera image. For example, in equation 2, height data of a human from 3D height data 180, in matrix form, $$X_i = \begin{bmatrix} X \\ Y \\ Z \\ 1 \end{bmatrix}^T \quad (2)$$

is multiplied by transformation matrix P, and produces:

-continued $$x_i = \begin{bmatrix} x \\ y \\ 1 \end{bmatrix}^T.$$

In one embodiment, units of camera focal length are chosen which converts 3D height data 180 in centimeters to a 2D measurement in pixel counts, for example, enabling a more direct comparison. In other embodiments, camera focal length units for the transformation matrix may be chosen to facilitate other conversions.

Returning to the flowchart of FIG. 3, camera height program 300 selects a 2D image height measurement and a 3D height data 180 height measurement sample from the respective, data sources (step 330). For example, camera height program 300 selects a height measurement sample from 3D height data 180 and a height measurement sample from 2D measurement data 195.

Camera height program 300 accounts for normalization of image heights due to varying distance from the camera by including a division operator ($P_3$), as depicted in equation (3), in the transformation calculation used in the objective function (equation 10):

$$x = \frac{P_1 X}{P_3 X}, \, y = \frac{P_2 X}{P_3 X} \quad (3)$$

where "P" is a three row transformation matrix comprised of focal length, an initial estimate of the camera height, the tilt angle of the camera and is used to convert the known height data of people to a 2D normalized measurement, accounting for images of humans at varying distances from the camera (step 335).

Camera height program 300 calculates the difference between a pairing of sample measurements from 2D measurement data 195 and the transformed 3D height data 180 measurement (step 340). For example, camera height program 300 uses the product of the transformation matrix and a measurement from 3D height data 180 to produce a normalized measurement of the 3D height to a 2D image measurement represented by coordinates (X,Y), where Y is the 2D image projected height. Camera height program 300 determines the difference between the normalized measurement of the 3D height and the data sample from 2D measurement data 195. In various embodiments, different approaches may be used to obtain a value for the difference between the normalized measurement of the 3D height and the 2D image height measurement. In one embodiment a Euclidean distance may be used to obtain a difference value, and in other embodiments, alternative techniques may be used.

The calculated difference between each pairing of samples of a normalized measurement of the 3D height and a 2D image measurement are summed in an objective function (equation 10) to establish an error term (step 350).

For example, the difference is determined between a normalized measurement of a sample from 3D height data 180 and a sample from 2D measurement data 195. The difference of each sample pairing is calculated (equation 10) and is added to an error term that is associated with the variance between a statistical measure of the distribution of normalized measurements of the samples of 3D height data 180 and the distribution of the samples of 2D measurement data 195 representing the image measurements of people.

The error term indicates the inaccuracy of the estimate of the camera height, and becomes smaller as the camera height estimate approaches the actual camera height. The estimated camera height is adjusted based on the error term and the adjusted estimate of the camera height converges towards the actual camera height value.

After calculating the difference between the normalized measurements of 3D height data 180 sample and 2D measurement data 195 sample, camera height program 300 determines there are more samples of measurements to select (step 360, "yes" branch). For example, having determined that there are additional normalized 3D measurement samples and 2D image measurement samples whose differences have not been determined, camera height program 300 selects another sample from the normalized measurements of 3D height data 180 and another sample from 2D measurement data 195 (loop to step 330). Camera height program 300 transforms the next sample from 3D height data 180 into a normalized measurement and determines the difference between the normalized measurement of 3D height data 180 and the next sample from 2D measurement data 195 (step 340). The difference between measurements is added to the error term (step 350), as described above, and camera height program 300 determines if there are additional samples to be selected (step 360).

Camera height program 300, having determined that no additional sample height measurements remain, (step 360, "no" branch), determines an adjustment to the current estimated camera height, based on the value of the error term generated by a summation of differences between the samples of the distributions of normalized measurements of 3D height data 180 and 2D measurement data 195. Camera height program 300 adjusts the current estimated camera height to generate a new estimated camera height (step 370).

In one embodiment, after the summation of the difference between multiple pairs of samples of the two distributions is complete, the partial differential of the error with respect to the current estimated camera height value (initially the estimate of camera height) is taken, and the result is added to adjust the current estimated camera height value, forming a new camera height value.

Camera height program 300 determines if the change to the value of the camera height error term is equal to or less than a predefined threshold value. Having determined that the change to the camera height error term is greater than the predefined threshold value (step 380, "no" branch), camera height program 300 returns to step 320 and regenerates the transformation matrix using the new camera height value. For example, the threshold value for the difference between the new camera height error term and the previous camera height error term is predefined as 0.01 pixel for camera height program 300. At the completion of an iteration of camera height program 300 determining and summing the differences between normalized measurements of 3D heights and 2D image measurements, a calculated portion of the error term is used to adjust the current estimated camera height (the adjustment can be a positive or negative value). Camera height program 300 compares the difference between the new error term and the previous error term, to the predefined threshold. If the difference is greater than the predefined 0.01 pixel threshold, the camera height estimate is not at an acceptable level of accuracy and camera height program 300 continues to optimize the estimated camera height. In other embodiments of the present invention, predefined threshold values may be used such that the difference in previous and current error terms are less than, equal to, or less than or equal to, the threshold value.

The new estimated camera height value becomes the current estimated camera height value, and using this camera height value, the transformation matrix is recalculated and samples from 3D height data 180 are transformed using the adjusted camera height, creating new normalized measurements of samples from 3D height data 180, which are compared to image measurement samples from 2D measurement data 195. The summation of differences is calculated again and summed to produce a next error value; the partial differential of which is added to the current height estimate to product a new camera height estimate. In one embodiment, the optimization process continues until a minimum value of the error term is obtained.

In another embodiment of the present invention, if camera height program 300 determines that the predefined threshold exceeds the difference between the new calculated error term and the previously calculated error term, then the current camera height is determined to be the fixed vertical height of the camera, and camera height program 300 ends (step 380, "yes" branch). For example, the new camera height error term is obtained by summation of the differences between multiple samples of 2D measurements of 3D height data 180 projections and multiple samples of 2D measurement data 195. The difference of the new error term and the previous error term is obtained, for example 0.008 pixels, and compared to the predefined threshold, for example 0.01 pixels. The predefined threshold exceeds the difference between the previous and new error terms, therefore the camera height is at an acceptable level of accuracy and camera height program 300 ends.

In another embodiment, camera height program 300 continues to determine the camera height estimate from each error term summation until a collection of camera height estimates of adequate number is obtained to form a distribution of camera heights, from which the mode or the mean camera height, may be selected as the constant height of the camera.

In an exemplary embodiment of the present invention, the following further illustrates the determination of the height of a camera, such as camera 110 in camera imaging system 100, as discussed above.

A sample of "n" height measurements of known 3D height of people is represented in equation (4) as the measurement set:

$$\text{Let 3D heights, } X_i = \{X_1, X_2, X_3, \ldots, X_{n-1}, X_n\}; \tag{4}$$

and a sample of "n" measurements of 2D people images is represented in equation (5) as the measurement set:

$$\text{Let 2D image heights, } x_i = \{x_1, x_2, x_3, \ldots, x_{n-1}, x_n\}. \tag{5}$$

Each measurement, $X_i$, is represented in three dimensional vectors as $(X_1, Y_1, Z_1)$. Samples of 2D image measurement data are available to computing device 170 and each measurement, $x_1$, is represented in two dimensional vectors as $(x_1, y_1)$.

The distribution of 2D image measurements of people will differ from the distribution of 3D height data 180 of people due to the tilt angle of the camera (t) and the height of the camera (initial estimate $h_0$). Transformation matrix, P is used to generate normalized measurements of height data from 3D height data 180, resulting in measurements with corresponding units and relative scale. Transformation matrix P includes an initial estimate of the camera height ($h_0$), the focal length of the lens of the camera (f), and the tilt angle of the camera (t), both the camera parameters provide by the camera or a file that includes the camera parameters.

The transformation matrix is represented in equation (6) by P.

$$P = \begin{bmatrix} f & h0 & t & 0 \\ f & h0 & t & 0 \\ 0 & 0 & 0 & 1 \end{bmatrix} \tag{6}$$

The difference between samples included in the distribution of 3D height data 180 (transformed to normalized measurements in two dimensions) and the samples included in the distribution of 2D measurement data 195, is determined. A summation of all calculated differences between sample pairings from the two distributions is performed in the objective function, equation (10), which generates an error term that is used to adjust the estimated camera height. Sample known heights of people from 3D height data 180 are transformed to a normalized measurement by equation (7):

$$x_i \cong P * X_i \tag{7}$$

where "P" is the transformation matrix, $X_i$ is a matrix of the three dimensions of the 3D height data 180 and "$x_i$" is the 2D projection matrix of "$X_i$". Equation (8) depicts additional detail of transforming a sample from 3D height data 180 to a normalized measurement, accounting for samples from 2D measurement data 195 at varying distances from camera 110.

$$x_i = \frac{P_1 X}{P_3 X}, y = \frac{P_2 X}{P_3 X} \tag{8}$$

To illustrate an example, values for 3D height data and 2D image measurements are applied to $X_1$, $x_1$, respectively, and values are applied to the initial camera height estimate, the camera focal length and the tilt angle of the camera. The values, for example purposes, are shown in the matrices of equation (9).

$$\text{Let } X_1 = \begin{bmatrix} 0 \\ 1.5 \\ 0 \\ 1 \end{bmatrix} \tag{9}$$

$$\text{Let } x_1 = \begin{bmatrix} 4 \\ 4 \\ 1 \end{bmatrix}$$

$$\text{Let } P = \begin{bmatrix} 1 & 2 & 0 & 0 \\ 1 & 2 & 0 & 0 \\ 0 & 0 & 0 & 1 \end{bmatrix}$$

The difference between the normalized measurements of 3D heights samples and the 2D image measurements samples, is calculated for each pairing of samples, and summed to determine an error term shown in equation (10), $$\Delta(h_0) = \sum_{i=1}^{n} \|x_i - P * X_i\|^2 \tag{10}$$

where "$\Delta(h_0)$" is the error term generated as a summation of the sample differences between the two distributions of measurements. The error term for the example is further evaluated as shown in equation (11).

$$\Delta(h_0) = \left\| \begin{bmatrix} 4 \\ 4 \\ 1 \end{bmatrix} - \begin{bmatrix} 1 & 2 & 0 & 0 \\ 1 & 2 & 0 & 0 \\ 0 & 0 & 0 & 1 \end{bmatrix} * \begin{bmatrix} 0 \\ 1.5 \\ 0 \\ 1 \end{bmatrix} \right\|^2 \quad (11)$$

$$\Delta(h_0) = \left\| \begin{bmatrix} 4 \\ 4 \\ 1 \end{bmatrix} - \begin{bmatrix} 3 \\ 3 \\ 1 \end{bmatrix} \right\|^2$$

Techniques to minimize the difference determined between the two distributions are used to determine the constant camera height. In one embodiment, simulated annealing is used to optimize the estimate of the camera height, whereas in other embodiments other techniques may be used. Evaluating the error term, the partial differential ($\delta_h$) with respect to the camera height estimate, (at this point the initial value, $h_0$) is added to the current estimate of the camera height to create a new estimate of the camera height, $h_1$ as shown in equation (12).

Let $h_1 = h_0 + \delta(h_0)$; $=2+0.1*2$; $=2.2$ \quad (12)

and using the adjusted value for the camera height estimate, the error for the new camera height "$h_1$" will be less than the error for the initial camera height "$h_0$", therefore "$h_1$" is a better estimate of camera height. In one embodiment, the optimization continues until the difference between the current error term and the previous error term is less than a predefined value. In general the error is minimized to obtain the most accurate estimate of the camera height.

FIG. 4 shows a block diagram of the components of a data processing system 400, 500, such as computing device 170, in accordance with an illustrative embodiment of the present invention. It should be appreciated that FIG. 4 provides only an illustration of one implementation and does not imply any limitations with regard to the systems in which different embodiments may be implemented. Many modifications to the depicted systems may be made based on design and implementation requirements.

Data processing system 400, 500 is representative of any electronic device capable of executing machine-readable program instructions. Data processing system 400, 500 may be representative of a smart phone, a computer system, PDA, or other electronic devices. Examples of computing systems, systems, and/or configurations that may be represented by data processing system 400, 500 include, but are not limited to, personal computer systems, server computer systems, thin clients, thick clients, hand-held or laptop devices, multiprocessor systems, microprocessor-based systems, network PCs, minicomputer systems, and distributed cloud computing systems that include any of the above systems or devices.

Computing device 170 includes internal components 400 and external components 500, illustrated in FIG. 4. Internal components 400 includes one or more processors 420, one or more computer-readable RAMs 422 and one or more computer-readable ROMs 424 on one or more buses 426, and one or more operating systems 428 and one or more computer-readable storage devices 430. The one or more operating systems 428 and camera height program 300, in computing device 170, are stored on one or more of the respective computer-readable storage devices 430 for execution by one or more of the respective processors 420 via one or more of the respective RAMs 422 (which typically include cache memory). In the embodiment illustrated in FIG. 4, each of the computer-readable storage devices 430 is a magnetic disk storage device of an internal hard drive. Alternatively, each of the computer-readable storage devices 430 is a semiconductor storage device such as ROM 424, EPROM, flash memory or any other computer-readable tangible storage device that can store a computer program and digital information. The term "computer-readable storage device" does not encompass a signal propagation media.

Internal components 400 also includes a R/W drive or interface 432 to read from and write to one or more portable computer-readable storage devices 536 such as a CD-ROM, DVD, memory stick, magnetic tape, magnetic disk, optical disk or semiconductor storage device. Camera height program 300, accessible to computing device 170, can be stored on one or more of the respective portable computer-readable storage devices 536, read via the respective R/W drive or interface 432 and loaded into the respective hard drive 430.

Each set of internal components 400, also includes network adapters or interfaces 436 such as a TCP/IP adapter cards, wireless wi-fi interface cards, or 3G or 4G wireless interface cards or other wired or wireless communication links. Camera height program 300 can be downloaded to computing device 170 from an external computer via a network (for example, the Internet, a local area network or other, wide area network) and respective network adapters or interfaces 436. From the network adapters or interfaces 436, camera height program 300 is loaded into the respective hard drive 430. The network may comprise copper wires, optical fibers, wireless transmission, routers, firewalls, switches, gateway computers and/or edge servers.

External components 500 may include a computer display monitor 520, a keyboard 530, and a computer mouse 534. External components 500 can also include touch screens, virtual keyboards, touch pads, pointing devices, and other human interface devices. Each of the sets of internal components 400 also includes device drivers 440 to interface to computer display monitor 520, keyboard 530 and computer mouse 534. Device drivers 440, R/W drive or interface 432 and network adapter or interface 436 comprise hardware and software (stored in storage device 430 and/or ROM 424).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java®, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for determining a height of a camera, the camera at an unknown fixed vertical height positioned above a reference plane, and having an axis of a lens of the camera at an acute angle with respect to a perpendicular of the reference plane, the method comprising the steps of:
  receiving from the camera, by one or more processors, over a specified time period, a multiplicity of images of a multiplicity of people of unknown height within a field of view of the camera;
  transforming, by one or more processors, a vertical axis of each image of the multiplicity of images of the multiplicity of people of unknown height into a pixel count of the camera;
  determining a statistical distribution of pixel counts of the multiplicity of images of the multiplicity of people of unknown height;
  receiving, by one or more processors, a statistical distribution of a multiplicity of people of known heights;
  transforming, by one or more processors, each height of the statistical distribution of the multiplicity of people of known heights to a normalized vertical measurement of a pixel count of the camera, based at least on a focal length of the lens of the camera and the acute angle of the camera, wherein the statistical distribution of the multiplicity of people of known heights is transformed into a statistical distribution of pixel counts of the multiplicity of people of known heights;
  performing, by one or more processors, an objective function in which the statistical distribution of pixel counts of the multiplicity of images of the multiplicity of people of unknown height is compared to the statistical distribution of the pixel counts of the multiplicity of people of known heights; and
  determining, by one or more processors, the fixed vertical height of the camera by adjusting within the objective function an estimate of the fixed vertical height of the camera, until a difference of comparing the statistical distribution of pixel counts of the multiplicity of images of the multiplicity of people of unknown height, to the statistical distribution of pixel counts from a normalization of heights of the multiplicity of people of known height, is minimized.

2. The method of claim 1, wherein the difference of comparing the statistical distribution of pixel counts of the people of unknown height to the statistical distribution of pixel counts of the multiplicity of people of known height includes a sum of differences between of a comparison of a pixel count of an image of a person of unknown height to a pixel count of the height of a person of known height, for a lesser quantity of pixel counts between the quantity of the multiplicity of images of people of unknown height, and the quantity of heights of the multiplicity of people of known height.

3. The method of claim 2, further comprising:
  determining, by one or more processors, a new estimated camera height by adjusting a current estimated camera height, based at least on an error term value of the objective function that includes the sum of the differences between a pixel count of an image of a person of unknown height to a pixel count of the height of a person of known height, for a lesser quantity of pixel counts between the quantity of the multiplicity of images of people of unknown height and the quantity of heights of the multiplicity of people of known height;
  determining, by one or more processors, if a threshold value exceeds a value of the error term; and
  in response to determining the threshold value to exceed the value of the error term, one or more processors determining the new estimated camera height to be the fixed vertical height of the camera.

4. The method of claim 2, wherein the sum of the differences between a comparison of a pixel count of an image of a person of unknown height, to a pixel count of the height of a person of known height, includes determining the sum of the differences between a comparison of a pixel count of an image of a person of unknown height from the distribution of the multiplicity of people of unknown height, to a statistical average of the distribution of pixel counts of the multiplicity of people of known height for a quantity of pixel counts that comprise the multiplicity of images of the multiplicity of people of unknown height.

5. The method of claim 1, wherein the objective function includes an initial estimate of the fixed vertical height of the camera, and a transformation matrix to convert the heights of the multiplicity of people of known height to normalized vertical measurement of pixel counts.

6. The method of claim 1, wherein the statistical distribution of pixel counts of the multiplicity of images of the multiplicity of people of unknown height and the statistical distribution of pixel counts of the multiplicity of people of known height, are non-parametric.

7. The method of claim 1, wherein transforming known heights of people from a known statistical distribution of heights of people, comprises:
  generating, by one or more processors, a multiple row transformation matrix that includes the focal length of the lens of the camera, the acute angle of the camera, a division operator, and a current estimated camera height;
  transforming, by one or more processors, each height of the statistical distribution of the multiplicity of people of known heights to a normalized vertical measurement of a pixel count of the camera by a product of the multiple row transformation matrix and a respective known height of a person of the multiplicity of people of known height;
  generating by one or more processors, an error term value of the objective function from a summation of differences between the pixel counts of the multiplicity of images of the multiplicity of people of unknown height, and the pixel counts of the multiplicity of people of known height;
  determining, by one or more processors, a new estimated camera height by an adjustment of the current estimated camera height, based at least on the error term value;

determining, by one or more processors, if a threshold value exceeds the error term value, wherein the threshold value is an acceptable error term value, determined by a difference between the current estimated camera height and the new estimated camera height at which the adjustment of the current estimated camera height is considered negligible; and in response to determining the threshold value to exceed the error term value, one or more processors determining the current estimated camera height to be the fixed vertical height of the camera.

8. A computer program product for determining a height of a camera, the camera at a fixed vertical height positioned above a reference plane, an axis of a lens of the camera at an acute angle with respect to a perpendicular of the reference plane, comprising:

one or more computer-readable storage devices and program instructions stored on the one or more computer-readable storage media, the program instructions comprising:

program instructions to receive from the camera, over a specified time period, a multiplicity of images of a multiplicity of people of unknown height within a field of view of the camera;

program instructions to transform a vertical axis of each image of the multiplicity of images of the multiplicity of people of unknown height into a pixel count of the camera;

program instructions to determine a statistical distribution of pixel counts of the multiplicity of images of the multiplicity of people of unknown height;

program instructions to receive a statistical distribution of a multiplicity of people of known heights;

program instructions to transform each height of the statistical distribution of the multiplicity of people of known heights to a normalized vertical measurement of a pixel count of the camera, based at least on a focal length of the lens of the camera, the acute angle of the camera, and a division operator of an objective function;

program instructions to perform an objective function in which the statistical distribution of pixel counts of the multiplicity of images of the multiplicity of people of unknown height is compared to the statistical distribution of the multiplicity of people of known heights, wherein each known height is normalized to a pixel count; and program instructions to determine the fixed vertical height of the camera by adjusting within the objective function, an estimate of the fixed vertical height of the camera, until a difference of comparing the statistical distribution of pixel counts of the multiplicity of images of the multiplicity of people of unknown height, to the statistical distribution of pixel counts from a normalization of heights of the multiplicity of people of known heights, is minimized.

9. The computer program product of claim 8, wherein the difference of comparing the statistical distribution of pixel counts of the people of unknown height to the statistical distribution of pixel counts of the multiplicity of people of known height includes a sum of differences between of a comparison of a pixel count of an image of a person of unknown height to a pixel count of the height of a person of known height, for a lesser quantity of pixel counts between the quantity of the multiplicity of images of people of unknown height and the quantity of heights of the multiplicity of people of known height.

10. The computer program product of claim 9, further comprising:

program instructions to determine a new estimated camera height by adjusting a current estimated camera height, based at least on an error term value of the objective function that includes the sum of the differences between a pixel count of an image of a person of unknown height to a pixel count of the height of a person of known height, for a lesser quantity of pixel counts between the quantity of the multiplicity of images of people of unknown height and the quantity of heights of the multiplicity of people of known height;

program instructions to determine, by one or more processors, if a threshold value exceeds a value of the error term; and in response to determining the threshold value to exceed the value of the error term, program instructions to determine the new estimated camera height to be the fixed vertical height of the camera.

11. The computer program product of claim 9, wherein the sum of the differences between of a comparison of a pixel count of an image of a person of unknown height to a pixel count of the height of a person of known height, includes program instructions to determine the sum of the differences between a comparison of a pixel count of an image of a person of unknown height from the distribution of the multiplicity of people of unknown height, to a statistical average of the distribution of known heights of a multiplicity of people for a quantity of pixel counts of the multiplicity of images of people of unknown height.

12. The computer program product of claim 8, wherein program instructions for the objective function include an initial estimate of the fixed vertical height of the camera, and a transformation matrix to convert the heights of the multiplicity of people of known height to normalized vertical measurement of pixel counts.

13. The computer program product of claim 8, wherein the statistical distribution of pixel counts of the multiplicity of images of the multiplicity of people of unknown height and the statistical distribution of pixel counts of the multiplicity of people of known height, are non-parametric.

14. A computer system for determining a height of a camera, the camera at a fixed vertical height positioned above a reference plane, an axis of a lens of the camera at an acute angle with respect to a perpendicular of the reference plane, the computer system comprising:

one or more computer processors;
one or more computer-readable memories;
one or more computer-readable storage devices;
program instructions stored on the one or more computer-readable storage devices for execution by the one or more processors via the one or more computer-readable memories, the program instructions comprising:

program instructions to receive from the camera, over a specified time period, a multiplicity of images of a multiplicity of people of unknown height within a field of view of the camera;

program instructions to transform a vertical axis of each image of the multiplicity of images of the multiplicity of people of unknown height into a pixel count;

program instructions to determine a statistical distribution of pixel counts of the multiplicity of images of the multiplicity of people of unknown height;

program instructions to receive a statistical distribution of known heights of a multiplicity of people;

program instructions to transform each height of the statistical distribution of known heights of the multiplicity of people to a normalized vertical measurement of a pixel count, based at least on a focal length of the lens of the camera, the acute angle of the camera, and a division operator of an objective function;

program instructions to perform an objective function in which the statistical distribution of pixel counts of the multiplicity of images of the multiplicity of people of unknown height is compared to the statistical distribution of the multiplicity of people of known heights, wherein each known height is normalized to a pixel count; and program instructions to determine the fixed vertical height of the camera by adjusting within the objective function, an estimate of the fixed vertical height of the camera, until a difference of comparing the statistical distribution of pixel counts of the multiplicity of images of the multiplicity of people of unknown height, to the statistical distribution of pixel counts from a normalization of heights of the multiplicity of people of known heights, is minimized.

15. The computer system of claim 14, wherein the difference of comparing the statistical distribution of pixel counts of the people of unknown height to the statistical distribution of pixel counts of the multiplicity of people of known height includes a sum of differences between of a comparison of a pixel count of an image of a person of unknown height to a pixel count of the height of a person of known height, for a lesser quantity of pixel counts between the quantity of the multiplicity of images of people of unknown height and the quantity of heights of the multiplicity of people of known height.

16. The computer system of claim 15, further comprising:
program instructions to determine a new estimated camera height by adjusting a current estimated camera height, based at least on an error term value of the objective function that includes the sum of the differences between a pixel count of an image of a person of unknown height to a pixel count of the height of a person of known height, for a lesser quantity of pixel counts between the quantity of the multiplicity of images of people of unknown height and the quantity of heights of the multiplicity of people of known height;
program instructions to determine, by one or more processors, if a threshold value exceeds a value of the error term; and
in response to determining the threshold value to exceed the value of the error term, program instructions to determine the new estimated camera height to be the fixed vertical height of the camera.

17. The computer system of claim 15, wherein the sum of the differences between of a comparison of a pixel count of an image of a person of unknown height to a pixel count of the height of a person of known height, includes program instructions to determine the sum of the differences between a comparison of a pixel count of an image of a person of unknown height from the distribution of the multiplicity of people of unknown height, to a statistical average of the distribution of known heights of a multiplicity of people for a quantity of pixel counts of the multiplicity of images of people of unknown height.

18. The computer system of claim 14, wherein program instructions for the objective function include an initial estimate of the fixed vertical height of the camera, and a transformation matrix to convert the heights of the multiplicity of people of known height to normalized vertical measurement of pixel counts.

19. The computer system of claim 14, wherein the statistical distribution of pixel counts of the multiplicity of images of the multiplicity of people of unknown height and the statistical distribution of pixel counts of the multiplicity of people of known height, are non-parametric.

20. The computer system of claim 14, wherein transforming known heights of people from a known statistical distribution of heights of people, comprises:
program instructions to generate a multiple row transformation matrix that includes the focal length of the lens of the camera, the acute angle of the camera, a division operator, and a current estimated camera height;
program instructions to transform each height of the statistical distribution of the multiplicity of people of known heights to a normalized vertical measurement of a pixel count of the camera by a product of the multiple row transformation matrix and a respective known height of a person of the multiplicity of people of known height;
program instructions to generate an error term value of the objective function from a summation of differences between the pixel counts of the multiplicity of images of the multiplicity of people of unknown height, and the pixel counts of the multiplicity of people of known height;
program instructions to determine a new estimated camera height by adjusting the current estimated camera height, based at least on the error term value;
program instructions to determine if a threshold value exceeds the error term value, wherein the threshold value is an acceptable error term value, determined by a difference between the current estimated camera height and the new estimated camera height at which the adjustment of the current estimated camera height is considered negligible; and
in response to determining the threshold value to exceed the error term value, program instructions to determine the current estimated camera height to be the fixed vertical height of the camera.

* * * * *